United States Patent
Radha et al.

[11] Patent Number: 6,134,352
[45] Date of Patent: Oct. 17, 2000

[54] SPATIAL ERROR CONCEALMENT FOR IMAGE PROCESSING

[75] Inventors: Hayder Sadiq Radha, Croton-on-Hudson, N.Y.; Hamid Reza Rabiee, West LaFayette, Ind.

[73] Assignee: Lucent Technologies Inc., Murray Hill, N.J.

[21] Appl. No.: 08/651,133

[22] Filed: May 21, 1996

[51] Int. Cl.⁷ .................................................. G06K 9/40

[52] U.S. Cl. ........................ 382/254; 382/275; 382/205; 358/448

[58] Field of Search .................................. 382/254, 275, 382/260, 190, 195, 205; 358/447, 448, 463

[56] References Cited

U.S. PATENT DOCUMENTS 5,623,558   4/1997   Billawala et al. .................... 382/254

*Primary Examiner*—Thomas D. Lee
*Attorney, Agent, or Firm*—Jeffery J. Brosemer

[57] ABSTRACT

An approach to synthesizing missing pixels in video images. The invention synthesizes an outermost ring of pixels within a block of missing pixels, based on adjacent, known, pixels. Then, the invention synthesizes the next-outermost ring, using, in part, pixels synthesized in the outermost ring, and proceeds in this manner to the innermost ring.

1 Claim, 19 Drawing Sheets

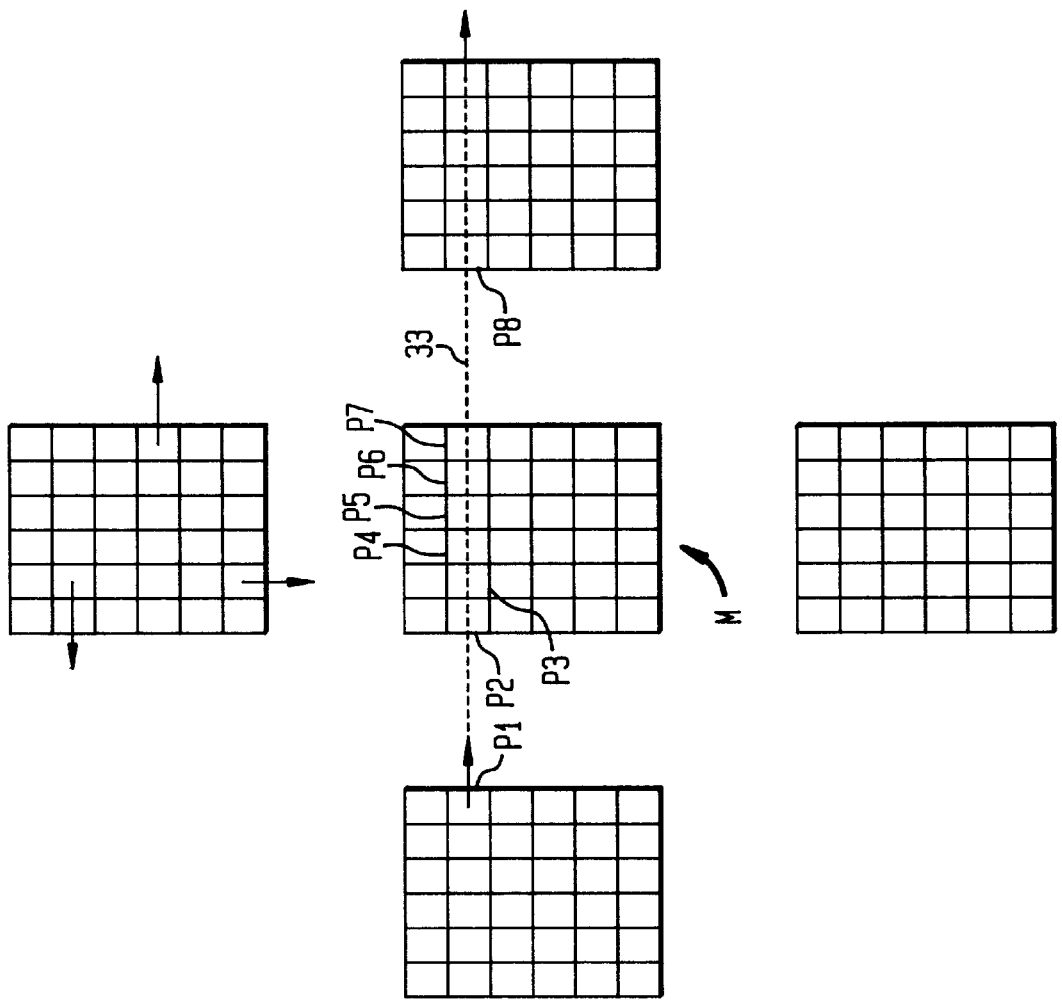

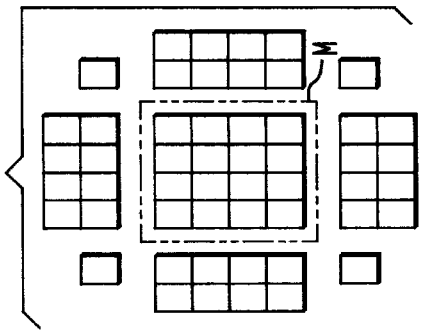
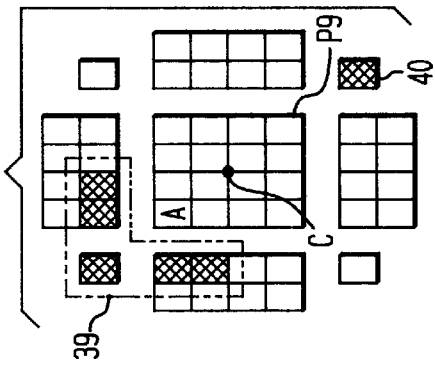
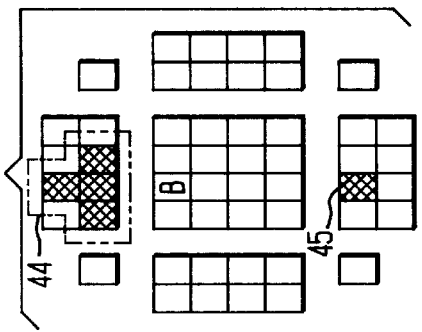
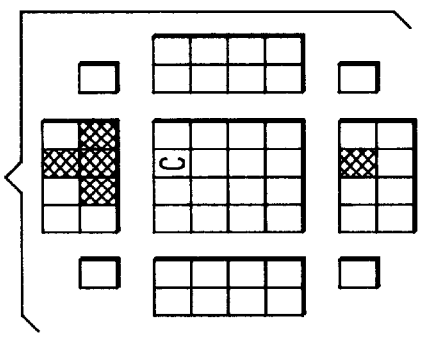
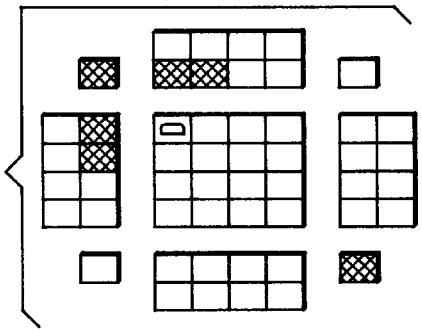
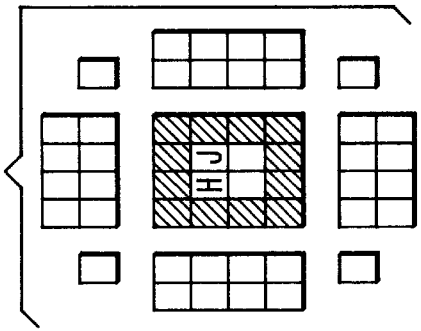
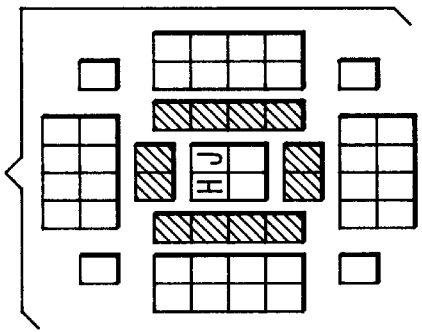
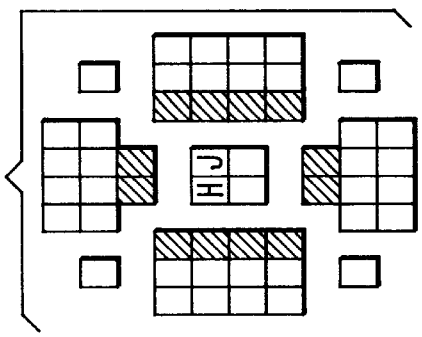

SPATIAL ERROR CONCEALMENT FOR IMAGE PROCESSING

The invention concerns reconstruction of missing blocks of pixels in a digital image.

BACKGROUND OF THE INVENTION

In personal video teleconferencing, telephone channels of relatively narrow bandwidth are commonly used to transmit video images. Under one standard, ISDN-BR1, the bandwidth is typically 128 Kilo-bits per second. Because full-motion, or near full-motion, video images generally require a larger bandwidth, data compression is used to fit the video data into the limited-bandwidth ISDN channel. However, the channel is not a perfect transmission line: a small probability exists that some data will be lost during transmission, because of (a) various errors occurring within the channel, and (b) traffic congestion over packet-switched networks.

In explaining selected aspects of these errors, this Background will (a) first discuss the frame structure for one type of standard digital image, (b) illustrate a digital image, conforming to the frame structure, and which contains regions of lost data, and then (c) discuss several prior-art approaches used to correct the lost data.

FIG. 1 illustrates the frame structure for an image transmitted using the H.261 format, which is a format established by the International Telecommunications Union, Telecommunications division, or ITU-T. The frame 3, which represents the video image seen by a viewer, takes the form of a pixel matrix of 288 lines, each containing 352 pixels, as indicated. The frame is divided into 12 Groups of Blocks, GOBs. Each GOB is divided into 33 Macro Blocks, MB. Each MB consists of an 16×16 array of pixels, as indicated.

FIG. 2 illustrates a representative picture to be transmitted. FIG. 3 illustrates the same picture, but with seven MBs removed, for experimental purposes. The missing MBs are labeled "MB." That Figure contains 12 GOBs, consistent with FIG. 1. Several prior-art approaches to correcting the missing MBs will now be discussed.

Automatic Repeat Request (ARO). A simple correction procedure detects the fact that MBs are missing, and requests a re-transmission of the missing MBs. However, this approach can impose significant delay in certain situations, and may create greater traffic congestion over the network.

Replacement by MB of Previous Frame. Another simple correction procedure replaces each missing MB with the MB which occupied the same position, but in the previous frame. In effect, the previous MB, in the previous frame, is "held over."

However, this approach requires a storage buffer to hold the previous MBs, in anticipation of the contingency that they will be needed as replacements for the subsequent frame. Also, if the image contains motion, as when the image shows a person walking, then this approach can produce jerky motion, as well as flash-like artifacts where the replacement occurs.

Replacement by Adjacent MB in Same Frame (RAB). The missing MB can be replaced by an adjacent MB in the same frame. In this approach, the adjacent MB now appears twice in the image: once at its original location, and once at location of the missing MB.

FIG. 4 illustrates this approach, applied to the picture of FIG. 3. Attention will be focused on the missing MB in GOB 5 in FIG. 3. (It is not practical to apply labels to FIG. 4.) This missing MB, located to the woman's right of her nose, has been replaced by the adjacent MB, as indicated in FIG. 4. The replacement MB contains part of her right eye, and appears twice: once in the normal position, and once to the woman's right of her nose.

The other missing MBs in FIG. 3 are replaced in a similar way, as FIG. 4 indicates. Every missing MB is replaced by an MB located horizontally adjacent.

FIG. 4 indicates that the results of this approach are not perfect. Further, it has been found that, if the replacement MB has a high contrast with the surrounding area, visual flashes can occur, as in the previous replacement approach.

Replacement by Interpolation of Neighboring Blocks. Each pixel in an MB is approximated by a linear, or polynomial, interpolation with the pixels of the surrounding blocks.

In FIG. 5A, block M is missing. It is surrounded by a north block, $B_n$, a northwest block, $B_{nw}$, a west block, $B_w$, and so on. For every pixel in the missing block M, a replacement is computed, according to the following function:

$$M = w_{nw}B_{nw} + w_n B_n + w_{ne}B_{ne} + w_e B_e + w_{se}B_{se} + w_s B_s + w_{sw}B_{sw} + w_w B_w \quad (1)$$

wherein each "w" represents a weighting factor, and each "B" and the "M" represent matrices.

FIG. 5C provides an example of the computation, using a 5×5 pixel matrix in each block for simplicity. As indicated, for each pixel within matrix M, the corresponding pixel within each block "B" is multiplied by its weighting factor "w", and the sum of these products produces the pixel value in M, as the equation in FIG. 5C indicates.

In a variant of this approach, fewer than eight neighboring blocks are used. For example, only the north, south, east, and west "B's" can be used, and FIG. 5B provides an example.

Replacement by Averaging Four Nearest Neighbors (Unconstrained Least Squares, ULS). This may be viewed as another variant of the previous approach. The weights in function (1) are all identical, at 0.25. Only the north, south, east, and west MBs are used. The function used is the following:

$$M = (B_n + B_w + B_e + B_s)/4 \quad (2)$$

Again, this is a matrix equation.

FIG. 6 provides an example of synthesis of missing MBs, using this approach. Again, it can be seen that the results are not perfect.

Replacement by Weighted Sum of Nearest Neighbors (Constrained Least Squares, CLS). This approach utilizes the following function:

$$M = w_n B_n + w_w B_w + w_e B_e + w_s B_s \quad (3)$$

wherein the "B's" again are matrices, containing the pixel values of the surrounding MBs, as in FIG. 5.

Function (3), although similar in form to function (2), is different in implementation: the weights, w, in function (3) are not predetermined constants, but are computed, based on surrounding pixels. In this computation, squared error vectors, E, are obtained, as follows:

$$E^2_n = (P_n - R_n)^t (P_n - R_n)$$

$$E^2_s = (P_s - R_s)^t (P_s - R_s)$$

$$E^2_w = (P_w - R_w)^t (P_w - R_w)$$

$$E^2_e = (P_e - R_e)^t (P_e - R_e)$$

wherein the P's represent pixel values of the single-pixel-wide boundary located outside the missing block M, as indicated in FIG. 7, and labeled $P_n$, $P_e$, etc.;

the R's represent missing pixel values, in the single-pixel-wide boundary located at the inside edge of the missing block M, as indicated in FIG. 7, and labeled $R_n$, $R_e$, etc.; and the symbol t represents the transpose of a vector matrix.

In effect, each error-term E within each vector represents a square of the difference between (a) a pixel at the inside edge of M (ie, within a row or a column R in FIG. 7), and (b) a bordering pixel (ie, within a row or column P in FIG. 7).

The system of equations is solved by minimizing the "E" variables, thereby producing the "P" variables, as by using known estimation techniques, which produce closed-form solutions. In the solution, the weights are computed based the solution to the following optimization function:

$$\min E^2 = w_n E^2_n + w_w E^2_s + w_e E^2_w + w_s E^2_e \qquad (3)$$

Once the outermost border of single pixels of the missing MB is computed, using function (3), the next-innermost border is computed, and so on. In a sense, the pixels at the edges of concentric squares are computed, beginning with the largest square.

FIG. 8 provides an example of synthesis of missing MBs, using this approach.

Replacement by First-Order Polynomial Interpolation (Bilinear Interpolation, BI). This approach uses the values of pixels at the four corners bounding the missing MP, which are indicated in FIG. 9. (Using pixels at the corners is exemplary; other pixels along the boundary can be used.) The estimated value of a missing pixel, g(x, y), is given by the following function:

$$g(x, y) = (1-t) u g_{nw} + t u g_{ne} + t(1-u) g_{sw} + (1-t)(1-u) g_{se}. \qquad (4)$$

wherein $$t = (x - x_1)/(x_3 - x_1) \text{ and}$$

$$u = (y - y_1)/(y_3 - y_1).$$

In another implementation, the four corner-pixels in FIG. 9 can be replaced by clusters of pixels.

In general, this approach may be viewed as finding a two-dimensional mean of a variable, g. FIG. 10 provides an example of synthesis of missing MBs, using this approach.

Replacement by Multi-Directional Non-Linear Interpolation. This approach is discussed in "Multidirectional Interpolation for Spatial Error Concealment," by W. Kwok and H. Sun, in IEEE Transactions on Consumer Electronics, vol. 39, no. 3, pp. 455–460 (August, 1993). A simplified summary is given as follows.

FIG. 11 illustrates a missing block M and four surrounding blocks $B_n$, $B_e$, $B_s$, and $B_w$. For each pixel within the surrounding blocks, a gradient, and magnitude, are obtained. The insert, indicated by arrow 30, shows five pixels in enlarged form, centered about the pixel which is labeled "80" in the insert, which indicates the pixel value.

Magnitudes of surrounding pixels are also given in the insert 30. The gradient is, in effect, the direction in which the maximum slope occurs. Slope is the change in pixel value with respect to distance. In FIG. 11, the highest slope occurs between the "80" pixel and the "5" pixel. The magnitude of the slope is 75, and the direction is downward, as indicated by the arrow labeled "75" and pointing downward. Gradients for multiple pixels are obtained, some of which are indicated by the arrows in FIG. 12.

The approach searches out gradients which lie on a common line, such as dashed line 33. Of these lines, the approach seeks lines which pass through the missing block M. When such lines are found, an interpolation is performed along the line, between extremum points.

For example, in FIG. 12, pixels P2 through P7 would be interpolated, based on the values of P1 and P8.

This approach produces poor results when the missing block M lies within a textured region. Also, the approach is noise-sensitive, and can generate false edges within the missing block M. Further, this approach requires extensive computation time.

The invention provides an approach for synthesis of missing blocks of data which eliminates many of the disadvantages inherent in the approaches just discussed.

SUMMARY OF THE INVENTION

In one form of the invention, pixels within a block of missing pixels are synthesized, beginning with an outermost ring of pixels, and proceeding to the innermost ring. Latter syntheses utilize pixel values assigned in previous syntheses.

BRIEF DESCRIPTION OF THE DRAWINGS

FIGS. 11 and 12 illustrate the concept of a gradient, used in the Multi-Directional Recursive Non-Linear Interpolation, described above.

FIGS. 13A through 13L (there is no 13I) illustrate synthesis of missing pixels, under one form of the invention.

DETAILED DESCRIPTION OF THE INVENTION

Figure 1:
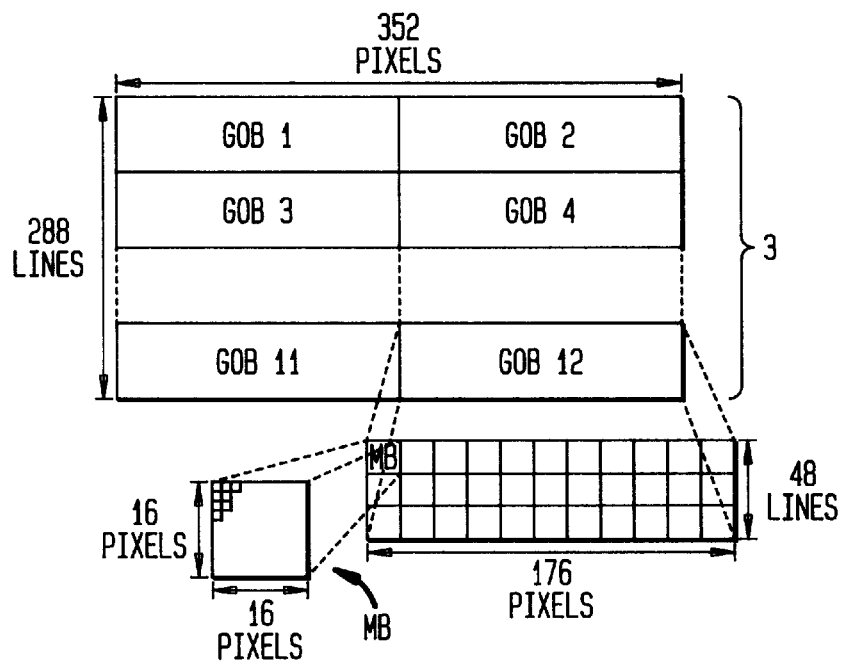
FIG. 1 illustrates a frame structure for the H.320 protocol.

FIG. 13A illustrates a missing block M, shown as a 4×4 pixel matrix, for simplicity, together with selected pixels surrounding it. The invention first synthesizes the peripheral pixels of the missing block M. In FIG. 13B, pixel A is synthesized, based on the hatched pixels.

The hatched pixels are of two types. Five of them, labeled 39, represent the five nearest neighbors. The remaining pixel 40 is termed an "outlier."

"Outlier" is a term-of-art. An outlier is a pixel diametrically across the center C of the missing block M from pixel A. From another perspective, it is a pixel adjacent to a pole of the pixel being computed. "Pole" refers to a pixel symmetric about some point, or axis, with the pixel being computed. In FIG. 13B, pixel P9 is a pole of pixel A, because pixels A and P9 are symmetric about the center C.

In computing the value of A, the invention first determines whether the outlier 40 should be used. In general, if the value of the outlier deviates too greatly from the neighbors 39, the outlier will not be used.

One approach to determining whether the outlier deviates too greatly is to take the mean of the five neighbors 39. If the outlier falls outside a specified range of the mean, then the outlier is not used. For example, if the mean is 100, and if the specified range is that the outlier must be no less than 20 percent of the mean, and no greater than 30 percent of the median, then the outlier must lie between 80 and 130, in order to be used.

If the outlier is used, then pixel A in FIG. 13B is assigned the median of the six hatched pixels shown, namely, the five nearest neighbors 39, plus the outlier 40. Ordinarily, the median is the value of the centermost pixel, when the pixels are listed in numerical order. Restated, half of the pixel values lie above the median, and half lie below. However, for an even number of pixels, such as six in this case, two centermost pixels exist. In this case, their average is taken as the median.

For example, if the pixel values are taken in ascending numerical order, and this order is:

87 95 110 118 119 120, then the value assigned to pixel A is the mean of 110 and 118, which are the two central values.

If the outlier is not used, then pixel A is assigned the value of the median of the five nearest neighbors 39. Alternately, pixel A can be assigned a weighted median of selected other pixels.

Next, pixel B, in FIG. 13C, is assigned a value, using the hatched pixels shown, which include four neighbors 44 and an outlier 45. The procedure is the same as discussed in connection with FIG. 13B.

Next, pixels C and D, in FIGS. 13D and 13E, are assigned values, in the same way, using the hatched pixels shown. This procedure is repeated for all peripheral pixels, thereby assigning values to the pixels shown as hatched in FIG. 13F.

These hatched pixels are split apart in the sequence of FIGS. 13G and 13H, to illustrate how they are used to compute other pixel values. Now, four pixels remain to be assigned values. Two of them are labeled H and J.

Figure 13L:
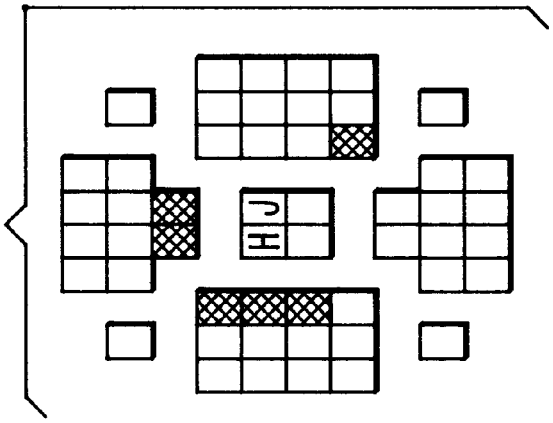
Figure 13K:
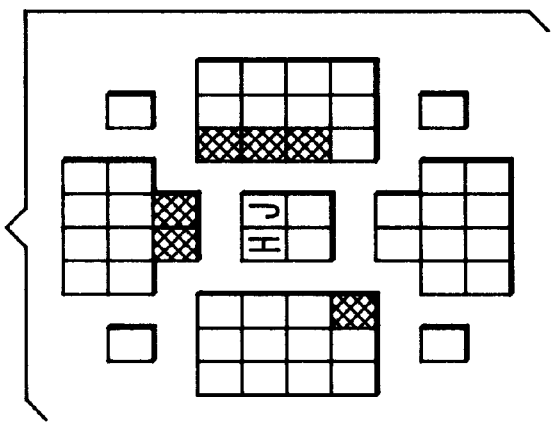
Figure 14:
FIGS. 14 and 15 illustrate results produced by the invention, when applied to FIG. 3.

Pixel H is assigned a value using the hatched pixels in FIG. 13K, and pixel J is assigned values using the hatched pixels shown in FIG. 13L. The procedure is the same as in FIG. 13B–E: adjacent pixels, plus an optional outlier, are used. The remaining two, unlabeled, pixels in FIG. 13L are assigned values in the same way. FIG. 14 illustrates results which the invention produces, when applied to the picture of FIG. 3.

Figure 13J:
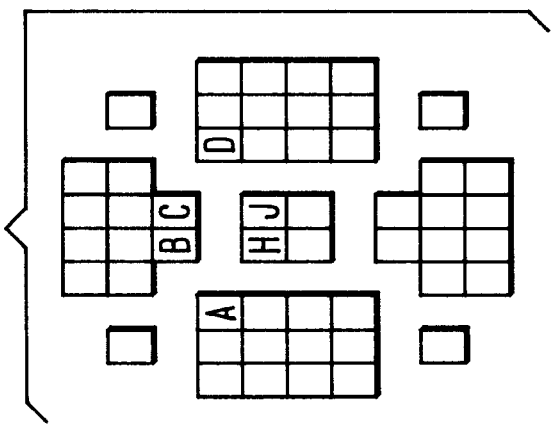

The computational approach for assigning a value to each of the pixels shown in FIG. 13 is termed a "filter." A "median" filter was described, meaning that the filter computed the assigned value, based on the median of the pixels used (ie, the hatched pixels, as in FIG. 13B).

The filter is also "recursive," because assigned pixel values are themselves used to assign values to other pixels. For example, the value of pixel A (which was computed by the invention) in FIG. 13B is used to assign a value to a subsequent pixel H in FIG. 13J.

Another approach can use a "weighted" recursive median filter. "Weighted" refers to determination of weights based on mean-squared error to emphasize pixel values which are more significant. That is, pixels farther removed from the mean will attain greater influence in the weighting process than nearby pixels, because of the squaring of the difference between the pixel and the mean. Alternately, mean absolute error can be used. Weighted mean-squared error computation is known in the art.

Figure 3:
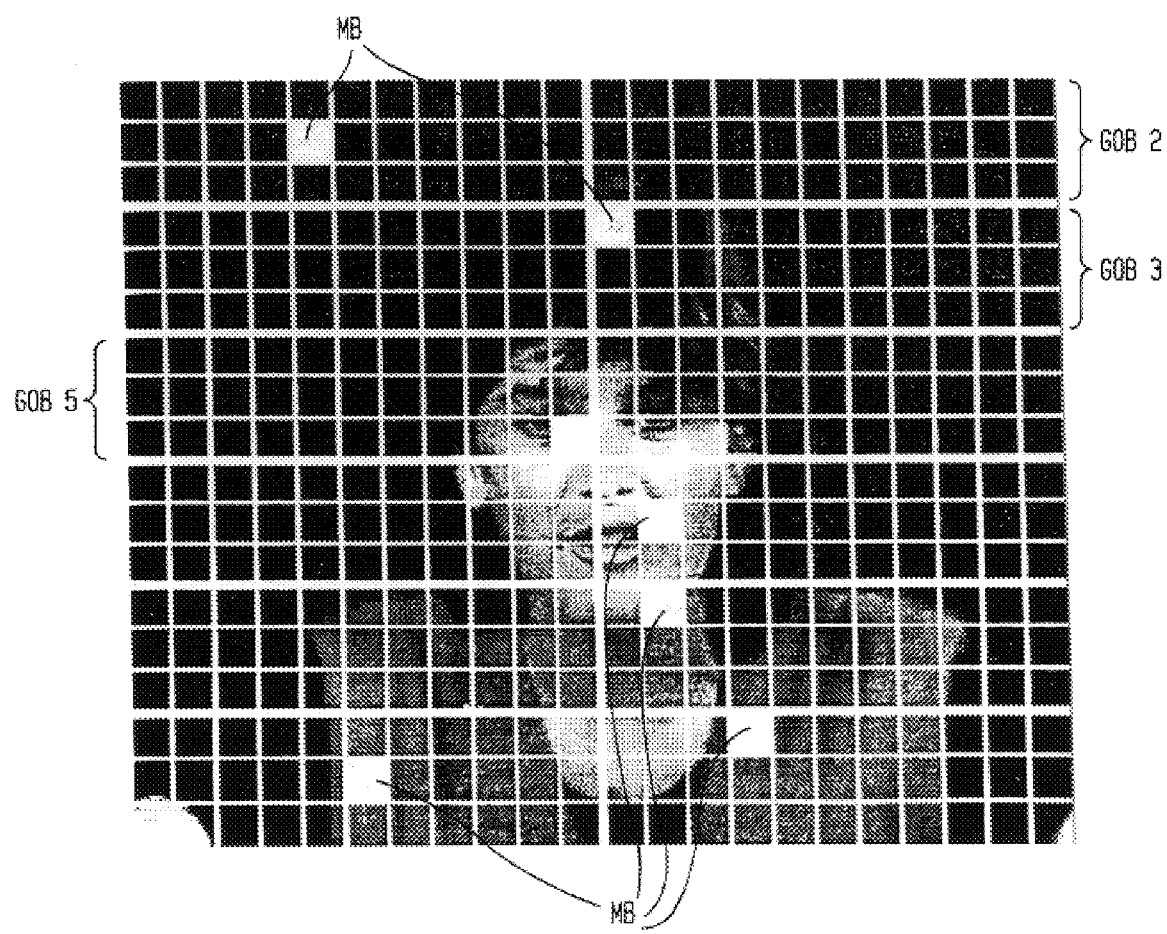
FIG. 3 illustrates the sample picture, but with several Macro-Blocks, MBs, missing.
Figure 4:
FIG. 4 illustrates results of a prior-art approach to reconstruction of FIG. 3.
Figure 5C:
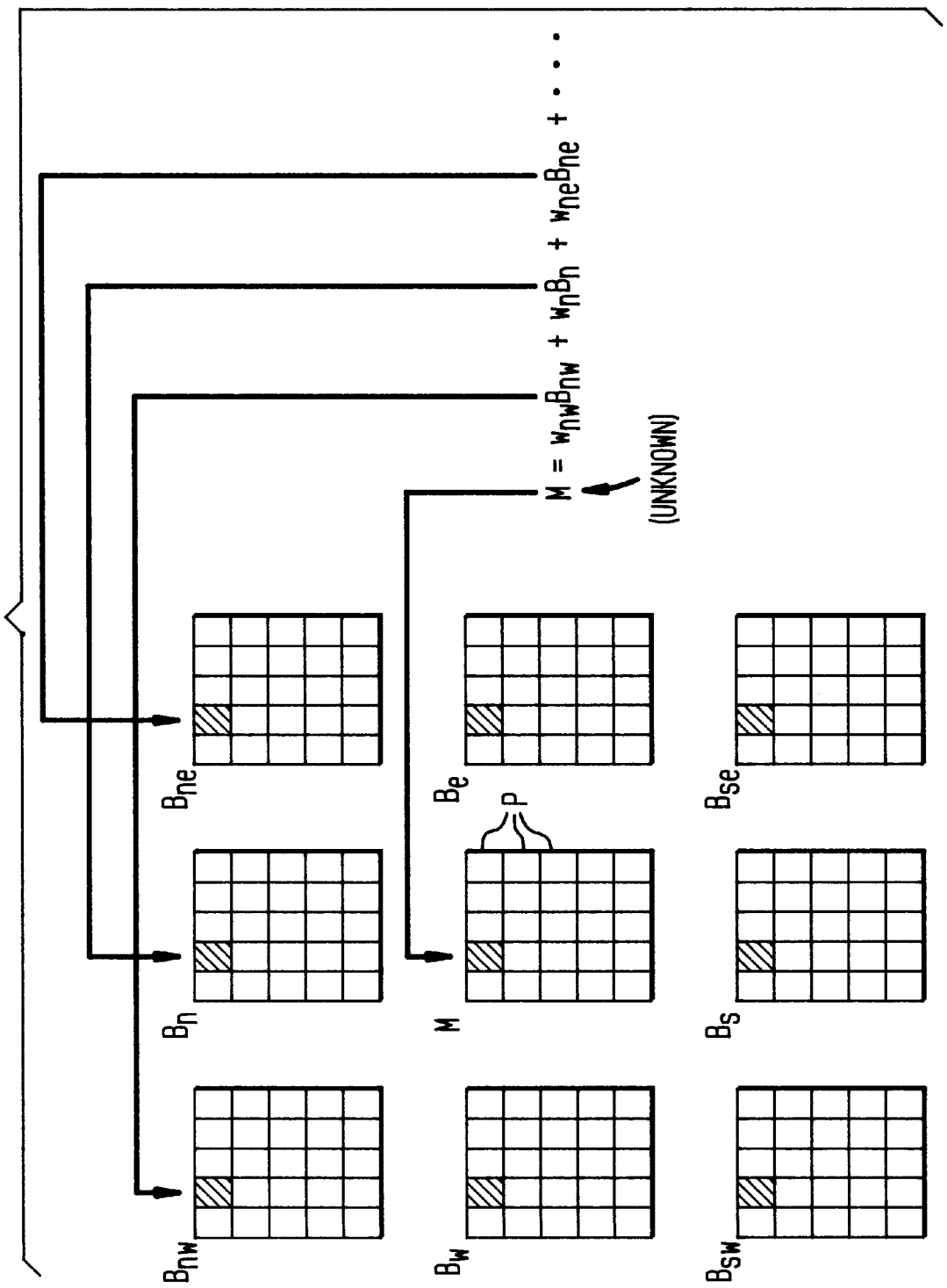
FIG. 5C illustrates correlation between terms of an equation, discussed herein, and pixels within the blocks of FIG. 5A.
Figure 6:
FIG. 6 illustrates results of another prior-art approach to reconstruction of FIG. 3.
Figure 15:

FIG. 15 illustrates application of the invention, using a weighted recursive median filter, to the picture of FIG. 3.

Noise Performance

Table 1, below, compares Peak Signal-to-Noise Ratio of the invention, as compared with some of the approaches discussed above.

TABLE 1

| APPROACH | PSNR |
| --- | --- |
| INVENTION (WMDRN) | 45.25 |
| INVENTION (MDRN) | 44.97 |
| BI | 40.44 |
| CLS | 42.81 |
| ULS | 40.76 |
| RPB | 34.69 |

General Approach

Figure 16B:
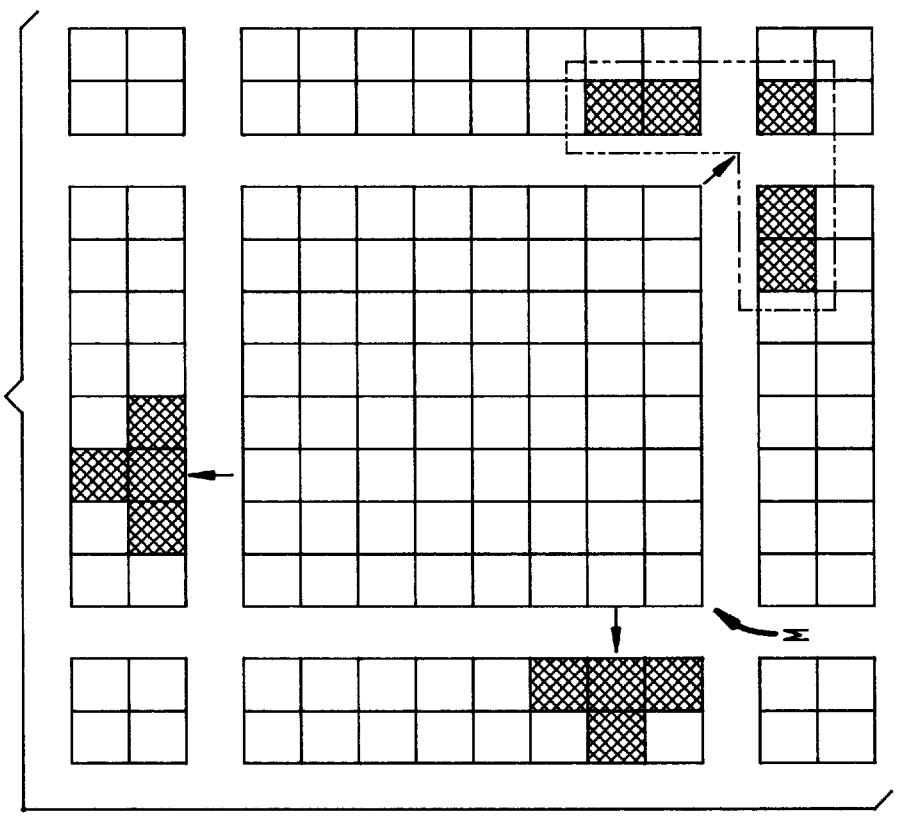
FIG. 16 illustrates a general procedure undertaken by the invention.
Figure 16A:
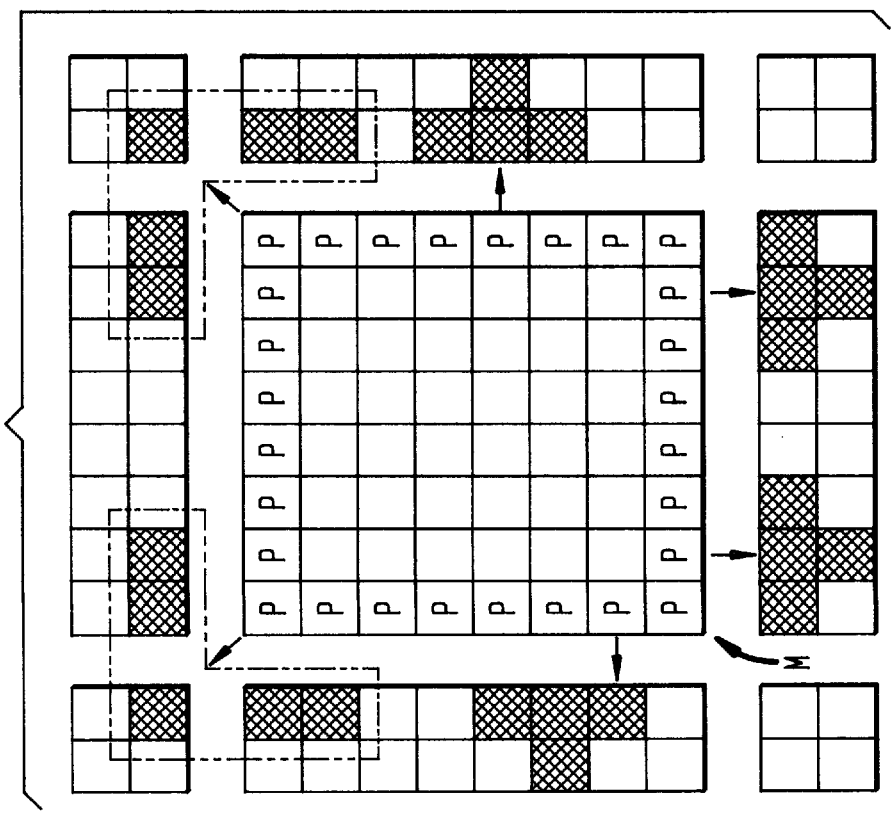

In FIG. 16, pixels P at the periphery of a missing block M are synthesized, using the clusters of pixels indicated by the arrows associated with selected peripheral pixels (clusters are not shown for all pixels to avoid clutter).

Each synthesis can use an outlier. Each synthesis can take the median of the cluster (plus one or more outliers, if applicable) as the value to assign the synthesized pixel. Alternately, each synthesis can use a weighted median, as discussed above. In addition, other approaches can be taken to infer a value for each missing pixel, based on the cluster-plus-outlier.

Figure 17:
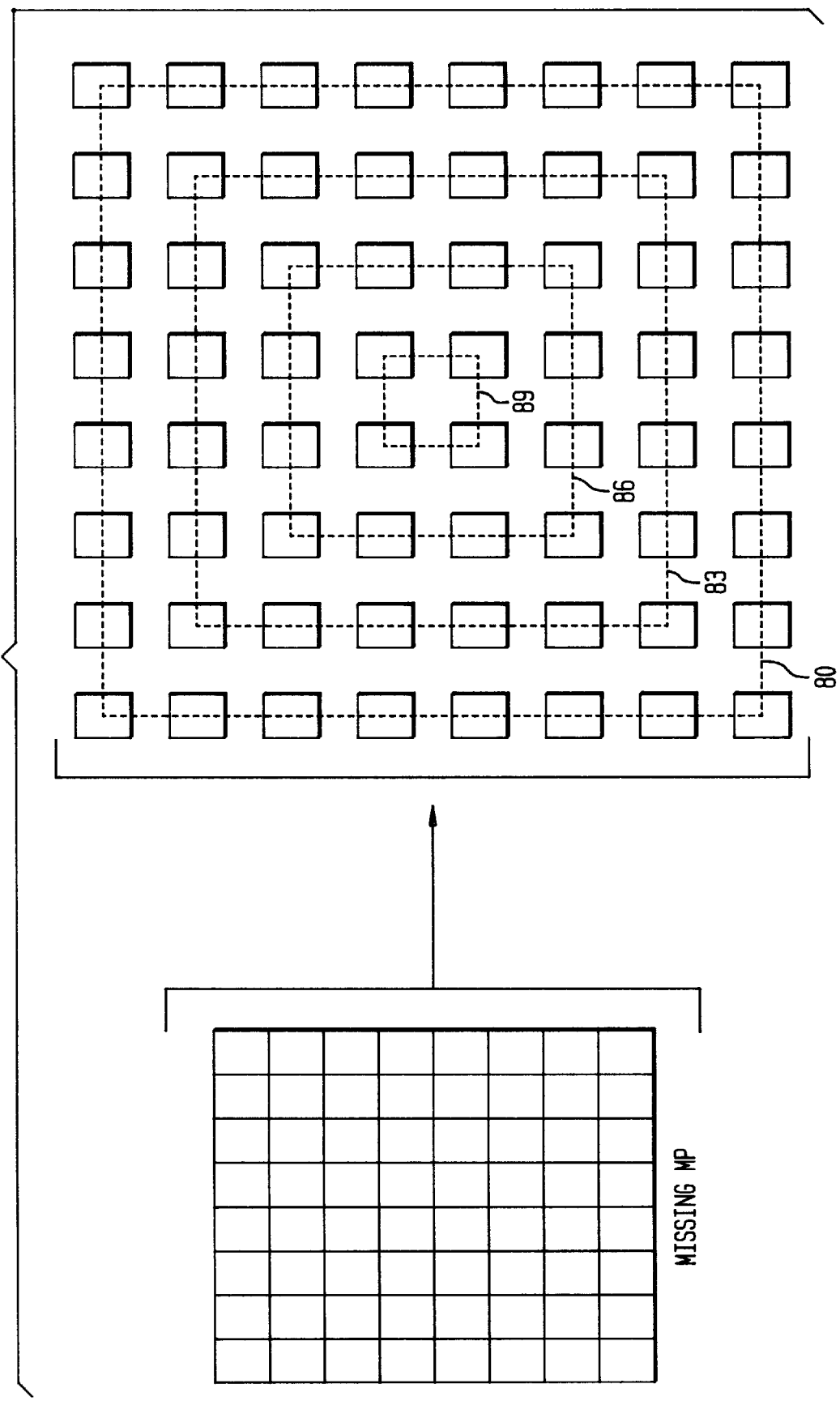
FIG. 17 illustrates the concept of peripheral pixels.
Figure 18B:
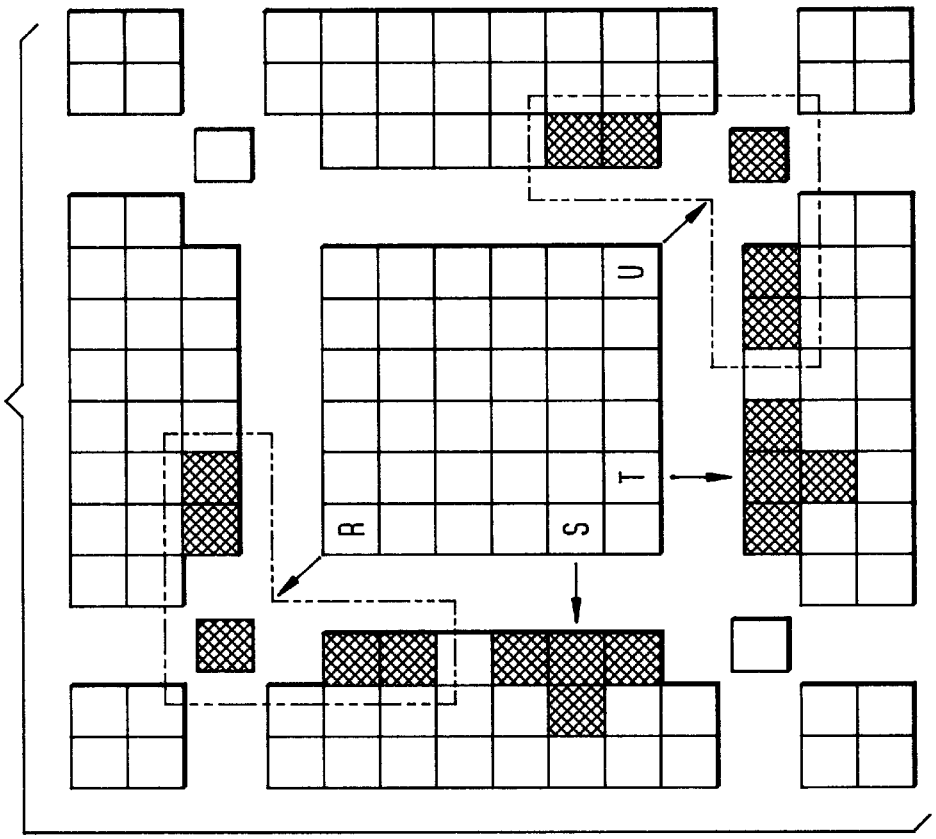
FIG. 18 illustrates computation of pixels along periphery 83.
Figure 18A:
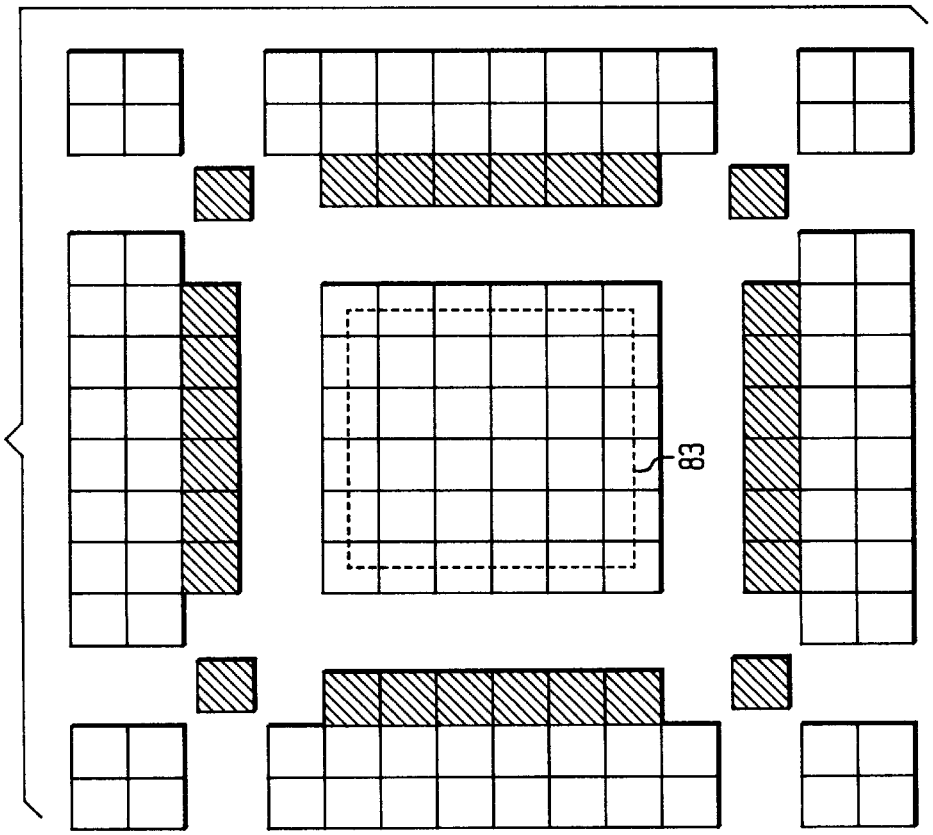

Once the peripheral pixels are assigned values, a next-innermost periphery is assigned values. A succession of peripheral pixels is shown in FIG. 17, and labeled 80, 83, 86, and 89. FIG. 18 illustrates computation of selected pixels within periphery 83 of FIG. 17, based on pixels shown as hatched.

Even though the four peripheries in FIG. 18 are rectangular, they can be termed "rings" or "rectangular rings," which are concentric. The invention estimates pixel values in the concentric rings successively, from the outermost ring to the innermost ring, or innermost pixel.

In general, each missing pixel is assigned a value, based on a neighboring cluster, and an outlier (which may contain more than one pixel). In one form of the invention, the pixels within the neighboring cluster are "adjacent," meaning that every pixel touches at least one other pixel, at least along an edge, or at a corner. The cluster of adjacent pixels is "adjacent" the missing pixel, meaning that at least one pixel in the cluster touches the missing pixel.

The outlier (or cluster of outliers) are not "adjacent" to the neighboring cluster. No pixels in the outlier touch the neighboring cluster.

In another form of the invention, the pixels in the neighboring cluster need not all touch, but no non-touching pixel can be separated by more than one pixel. (That is, the separating pixel touches both a pixel within the cluster, and the remote, non-touching pixel.)

Flow Chart

Figure 19:
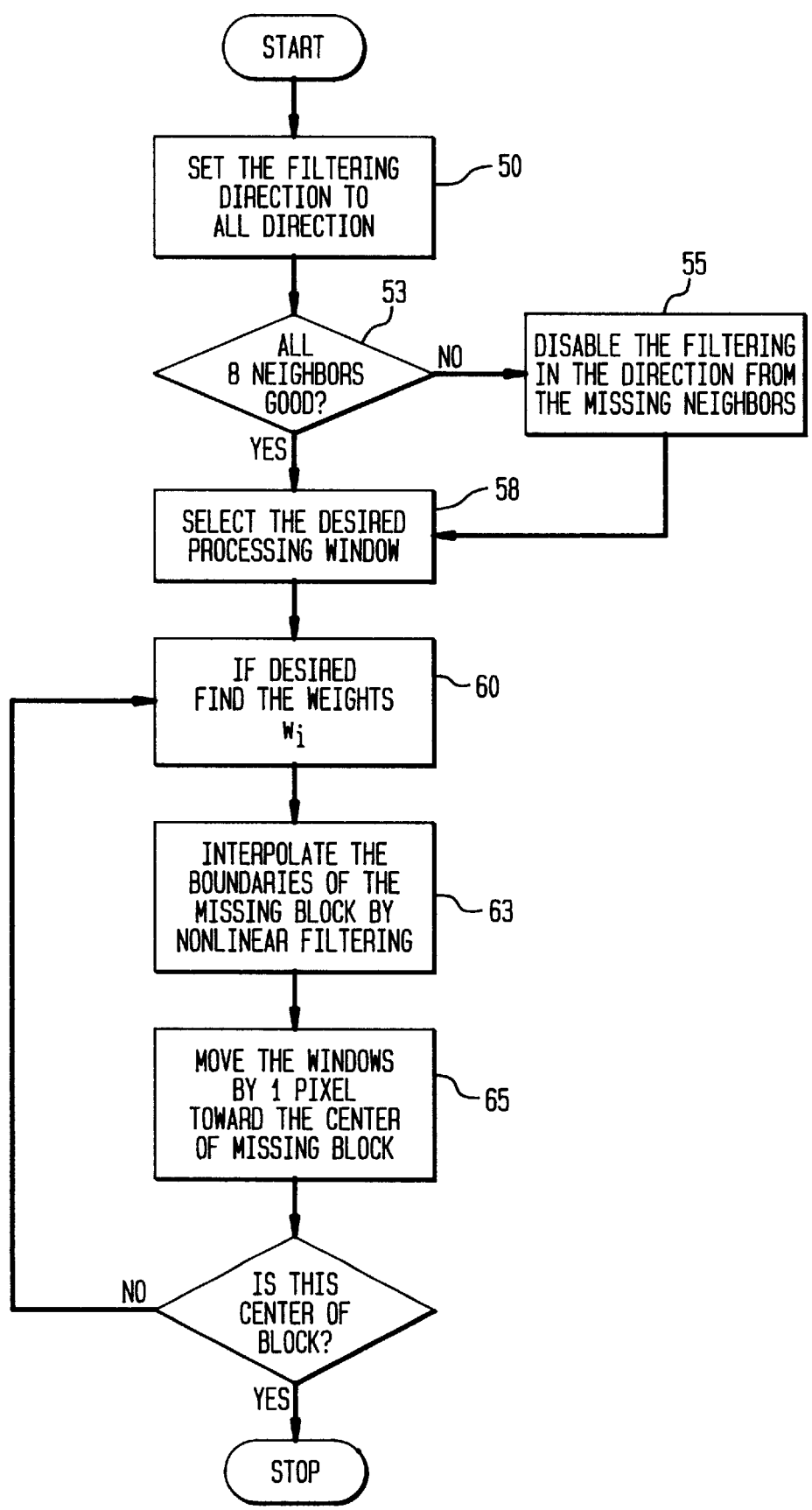
FIG. 19 is a flow chart illustrating logic used by one form of the invention.

FIG. 19 is a flow chart which illustrates selected logic steps undertaken by the invention.

Figure 5A:
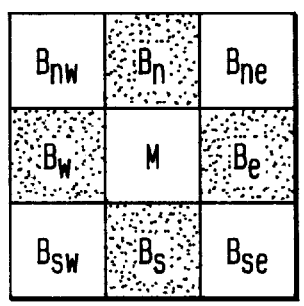
FIGS. 5A and 5B illustrate missing blocks M, and adjacent blocks B.
Figure 5B:
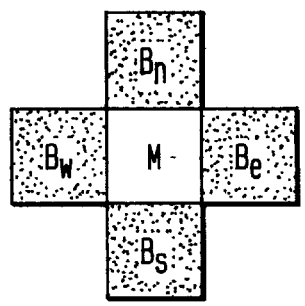
Figure 2:
FIG. 2 illustrates a sample picture.
Figure 7:
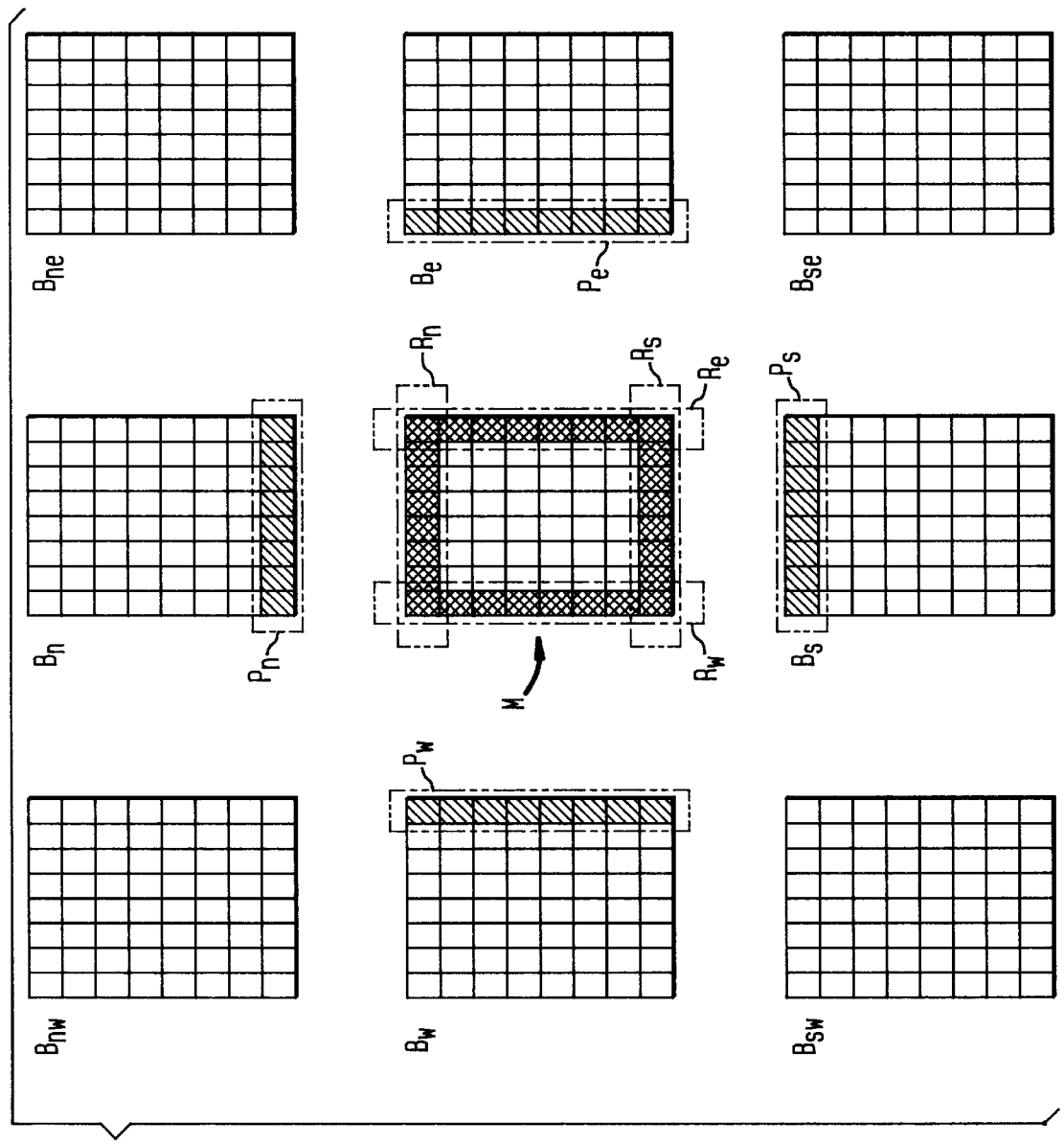
FIG. 7 illustrates variables used in Function (2), discussed above.
Figure 8:
FIG. 8 illustrates results of another prior-art approach to reconstruction of FIG. 3.
Figure 9:
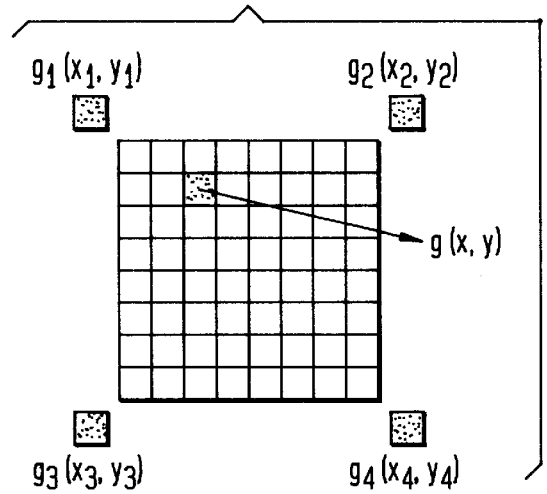
FIG. 9 illustrates variables used in Function (3), discussed above.
Figure 11:
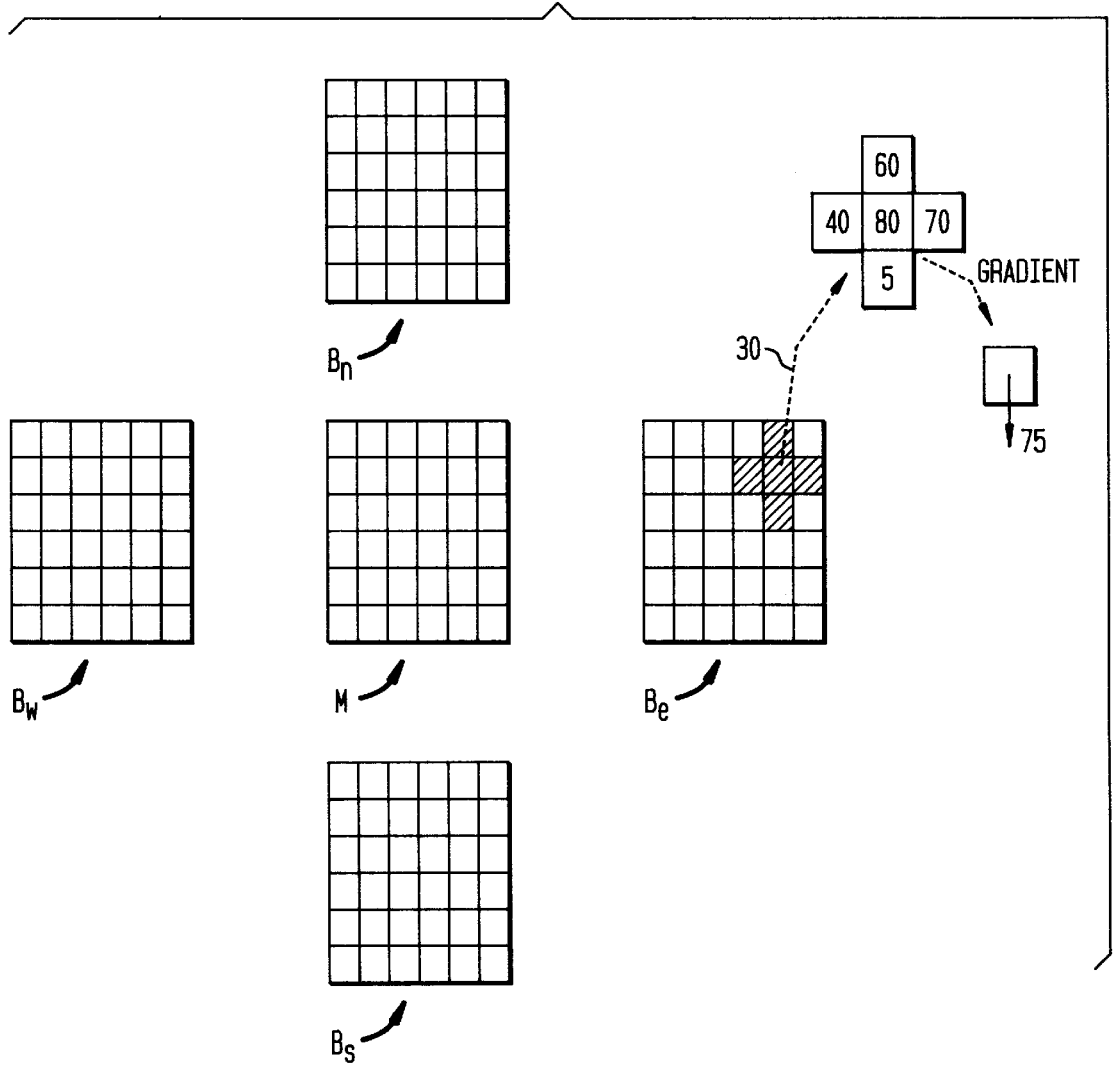
Figure 10:
FIG. 10 illustrates results of another prior-art approach to reconstruction of FIG. 3.

In FIG. 19, balloon 50 indicates that, initially, all eight neighboring blocks are used in the computation. (FIGS. 5A and 7 illustrate neighboring blocks B with respect to missing block M.) However, it is possible that the eight blocks themselves may include a missing block. In such a case, balloons 53 and 55 in FIG. 19 identify the blocks which are to be used.

In balloon 58, the type of processing windows to be used are specified by the user. FIG. 20 illustrates several types of window. Dashed box 39 in FIG. 13B illustrates another type of window. In general, a "window" represents the rules by which the pixels are selected in order to synthesize a given, unknown, pixel.

In balloon 60 in FIG. 19, weights are computed, if desired. In the discussion above, an unknown pixel was assigned the value of the numerical median of the pixels in its associated window. However, as discussed above, a weighted median approach can be taken. The weights in balloon 60 refer to the weights in such a case.

Balloon 63 indicates estimation by non-linear filtering. This estimation is done for all pixels in the periphery of the missing block. For example, in FIG. 17, periphery 80 may be processed first.

Balloon 65 indicates moving the periphery inward by one pixel. For example, after periphery 80 in FIG. 17 is processed, the periphery is moved to periphery 83, which is one pixel inward.

The computation is repeated, until the center of the missing block is reached.

Numerous substitutions and modifications can be undertaken without departing from the true spirit and scope of the invention. What is desired to be secured by Letters Patent is the invention as defined in the following claims.

We claim:

1. In a method of synthesizing pixels in a missing block of pixels within an image, the improvement comprising:

a) for each missing pixel within the block, assigning a value, based on
   i) a group 1 of pixels neighboring the missing pixel, and
   ii) a group 2 of one or more pixels which
      A) do not neighbor the missing pixel, and
      B) do neighbor the block;

b) comparing a pixel value A representing group 2 with a pixel value B representing group 1, and c) if A deviates sufficiently from B, then c) if A deviates sufficiently from B, then ignoring group 2 for the respective pixel being assigned a value.

* * * * *